US012055162B2

(12) United States Patent
Nose et al.

(10) Patent No.: US 12,055,162 B2
(45) Date of Patent: Aug. 6, 2024

(54) HYDRAULIC DRIVE SYSTEM

(71) Applicant: KAWASAKI JUKOGYO KABUSHIKI KAISHA, Kobe (JP)

(72) Inventors: Tomomichi Nose, Kobe (JP); Hayato Kawasaki, Kobe (JP); Hideyasu Muraoka, Kobe (JP); Nobuyuki Kinoshita, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/044,332

(22) PCT Filed: Sep. 9, 2021

(86) PCT No.: PCT/JP2021/033136
§ 371 (c)(1),
(2) Date: Mar. 7, 2023

(87) PCT Pub. No.: WO2022/054868
PCT Pub. Date: Mar. 17, 2022

(65) Prior Publication Data

US 2023/0323901 A1 Oct. 12, 2023

(30) Foreign Application Priority Data

Sep. 14, 2020 (JP) ................................ 2020-153515

(51) Int. Cl.
*F15B 11/17* (2006.01)
*E02F 9/22* (2006.01)
(Continued)

(52) U.S. Cl.
CPC ............ *F15B 11/17* (2013.01); *E02F 9/2203* (2013.01); *E02F 9/2242* (2013.01);
(Continued)

(58) Field of Classification Search
CPC ....... F15B 11/042; F15B 11/044; F15B 11/05; F15B 11/165; F15B 11/17;
(Continued)

(56) References Cited

U.S. PATENT DOCUMENTS 5,148,676 A * 9/1992 Moriya ................ E02F 9/2282 60/486
5,211,014 A * 5/1993 Kropp .................... F15B 11/17 91/532

(Continued)

FOREIGN PATENT DOCUMENTS

| | | |
|---|---|---|
| JP | H06123302 A | 5/1994 |
| JP | H11303814 A | 11/1999 |
| JP | 2000266009 A | 9/2000 |

*Primary Examiner* — Michael Leslie
(74) *Attorney, Agent, or Firm* — Alleman Hall & Tuttle LLP

(57) ABSTRACT

This hydraulic drive system includes: first and second circuit systems; first and second hydraulic pumps; a merge valve that opens and closes a merge passage connecting the hydraulic pumps; an operation device that outputs an operation command corresponding to an amount of operation specifying an amount of actuation of first and second hydraulic actuators; and a control device that controls the merge valve according to the operation command from the operation device. The first circuit system includes: a first meter-in control valve that controls a meter-in flow rate of the working fluid that flows to the first hydraulic actuator; and a first meter-out control valve that controls a meter-out flow rate of the working fluid that is drained from the first hydraulic actuator into a tank. The control device controls an opening degree of the first meter-in control valve and an opening degree of the first meter-out control valve.

6 Claims, 4 Drawing Sheets

(51) Int. Cl.
*F15B 11/042* (2006.01)
*F15B 11/044* (2006.01)
*F15B 11/05* (2006.01)

(52) U.S. Cl.
CPC .......... *F15B 11/042* (2013.01); *F15B 11/044* (2013.01); *F15B 11/05* (2013.01); *F15B 2211/30565* (2013.01); *F15B 2211/351* (2013.01); *F15B 2211/353* (2013.01); *F15B 2211/6309* (2013.01); *F15B 2211/6313* (2013.01); *F15B 2211/6346* (2013.01); *F15B 2211/7135* (2013.01); *F15B 2211/7142* (2013.01)

(58) Field of Classification Search
CPC .... F15B 2211/30565; F15B 2211/6309; F15B 2211/6313; E02F 9/2203; E02F 9/2239; E02F 9/2242
See application file for complete search history.

(56) References Cited

U.S. PATENT DOCUMENTS

| | | | | |
|---|---|---|---|---|
| 5,970,709 | A * | 10/1999 | Tohji | E02F 9/2292<br>60/429 |
| 7,520,130 | B2 * | 4/2009 | Tanaka | F15B 11/17<br>60/429 |
| 8,464,826 | B2 * | 6/2013 | Yamada | F15B 11/163<br>180/308 |
| 10,604,913 | B2 * | 3/2020 | Kamoshita | E02F 9/2296 |
| 10,604,916 | B2 * | 3/2020 | Matsuzaki | F15B 1/04 |
| 11,408,145 | B2 * | 8/2022 | Kouno | E02F 9/2267 |

* cited by examiner

HYDRAULIC DRIVE SYSTEM

TECHNICAL FIELD

The present invention relates to a hydraulic drive system that drives a hydraulic actuator.

BACKGROUND ART

Known examples of a hydraulic drive system include a hydraulic control device such as that disclosed in Patent Literature (PTL) 1. The hydraulic control device includes two circuit systems. Separate hydraulic pumps are connected to the circuit systems. Furthermore, the two hydraulic pumps are connected to each other by a merge valve. Thus, working fluids discharged from the two hydraulic pumps can merge by the merge valve and flow to one or both of the two circuit systems.

CITATION LIST

Patent Literature

PTL 1: Japanese Laid-Open Patent Application Publication No. H06-123302

SUMMARY OF INVENTION

Technical Problem

In the hydraulic control device disclosed in PTL 1, a pressure compensation valve is provided for each hydraulic actuator. With this, the flow rate of a working fluid flowing to a hydraulic actuator under a less load is kept from becoming unevenly high during simultaneous movement of a plurality of hydraulic actuators. On the other hand, a pressure loss occurs as a result of providing the pressure compensation valve. In this case, energy consumption by the hydraulic control device, that is, a hydraulic drive system, cannot be reduced.

Thus, an object of the present invention is to provide a hydraulic drive system capable of reducing energy consumption.

Solution to Problem

A hydraulic drive system according to the present invention includes: a first circuit system that controls supply and drainage of a working fluid to and from a first hydraulic actuator; a first hydraulic pump that supplies the working fluid to the first circuit system; a second circuit system that controls supply and drainage of the working fluid to and from a second hydraulic actuator; a second hydraulic pump that supplies the working fluid to the second circuit system; a merge valve that opens and closes a merge passage connecting the first hydraulic pump and the second hydraulic pump; an operation device that outputs an operation command corresponding to an amount of operation specifying an amount of actuation of each of the first hydraulic actuator and the second hydraulic actuator; and a control device that controls an operation of the merge valve according to the operation command from the operation device. The first circuit system includes: a first meter-in control valve that controls a meter-in flow rate of the working fluid that flows to the first hydraulic actuator; and a first meter-out control valve that controls a meter-out flow rate of the working fluid that is drained from the first hydraulic actuator into a tank. The control device controls an opening degree of the first meter-in control valve and an opening degree of the first meter-out control valve.

According to the present invention, when the first hydraulic actuator and the second hydraulic actuator are simultaneously operated and the load on the first hydraulic actuator is small with respect to the second hydraulic actuator, the control device can control the opening degree of the first meter-in control valve to secure the flow rate of the working fluid flowing to the first hydraulic actuator. This allows elimination of a pressure compensation valve that is to be provided for the first hydraulic actuator; thus, it is possible to reduce energy consumption when the first hydraulic actuator and the second hydraulic actuator are simultaneously operated.

Advantageous Effects of Invention

With the present invention, it is possible to reduce energy consumption.

The above object, other objects, features, and advantages of the present invention will be made clear by the following detailed explanation of preferred embodiments with reference to the attached drawings.

DESCRIPTION OF EMBODIMENTS

Figure 1:
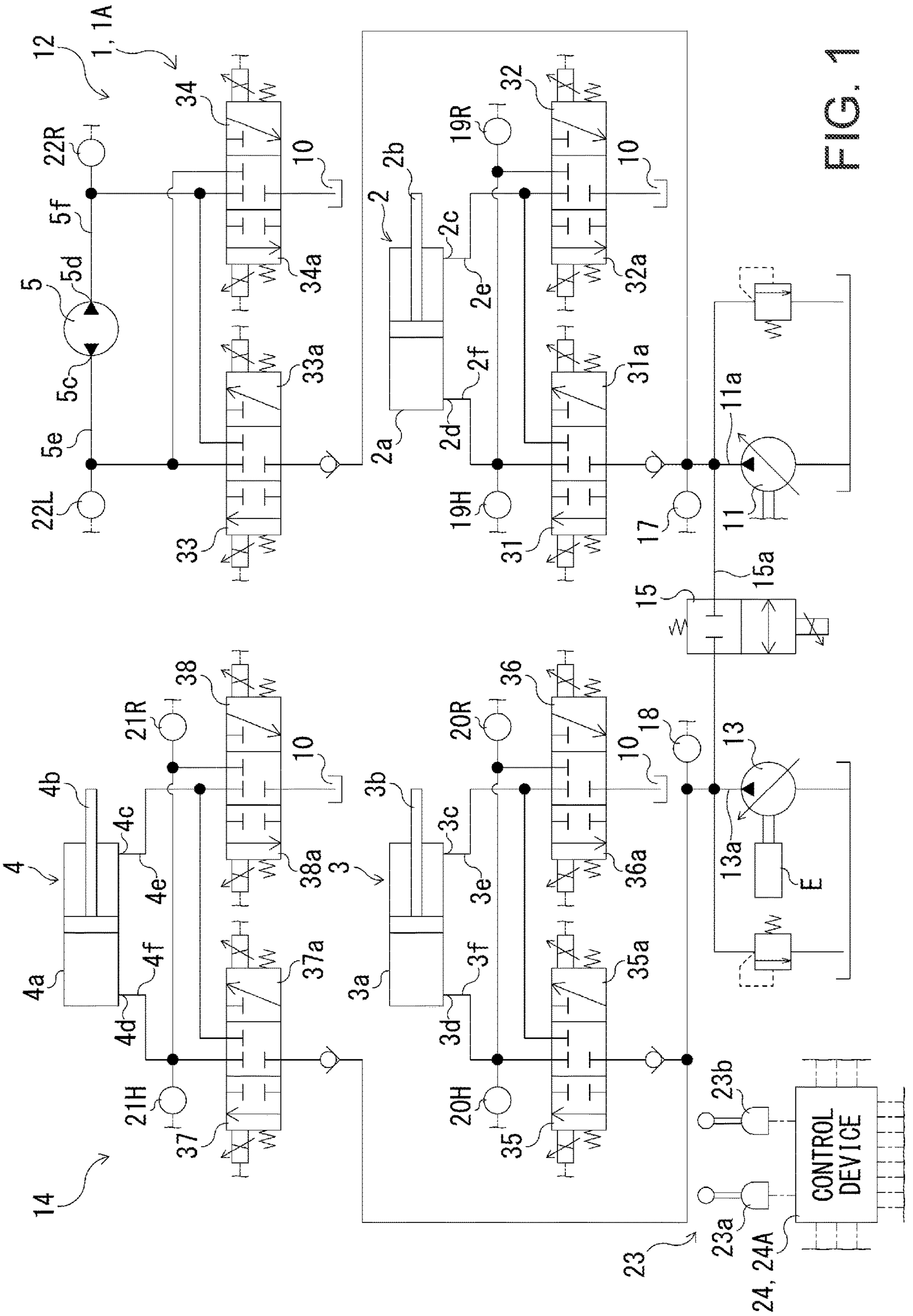
FIG. 1 is a hydraulic circuit diagram illustrating a hydraulic drive system according to Embodiment 1 of the present invention.

Hereinafter, hydraulic drive systems 1, 1A according to Embodiments 1 and 2 of the present invention will be described with reference to the aforementioned drawings. Note that the concept of directions mentioned in the following description is used for the sake of explanation; the orientations, etc., of elements according to the invention are not limited to these directions. Each of the hydraulic drive systems 1, 1A described below is merely one embodiment of the present invention. Thus, the present invention is not limited to the embodiments and may be subject to addition, deletion, and alteration within the scope of the essence of the invention.

Embodiment 1

<Hydraulically Driven Equipment>

Hydraulically driven equipment such as construction equipment, industrial equipment, and industrial vehicles includes a plurality of hydraulic actuators 2 to 5 and the hydraulic drive system 1. The hydraulically driven equipment is capable of moving various elements by actuating the hydraulic actuators 2 to 5. The hydraulic actuators 2 to 5 are, for example, hydraulic cylinders and a hydraulic motor. In the present embodiment, the hydraulically driven equipment is a hydraulic excavator, for example. The plurality of hydraulic actuators 2 to 5 are an arm cylinder 2, a boom cylinder 3, a bucket cylinder 4, and a turning motor 5, for example.

The hydraulic cylinders 2 to 4 can extend and retract to move various elements, i.e., an arm, a boom, and a bucket (which are not illustrated in the drawings), respectively. More specifically, the hydraulic cylinders 2 to 4 are the arm cylinder 2 which is one example of the first hydraulic actuator, the boom cylinder 3 which is one example of the second hydraulic actuator, and the bucket cylinder 4. In the hydraulic cylinders 2 to 4, rods 2*b* to 4*b* are inserted into cylinder tubes 2*a* to 4*a*, respectively, so as to be able to move back and forth. Rod-end ports 2*c* to 4*c* and head-end ports 2*d* to 4*d* are formed on the cylinder tubes 2*a* to 4*a*, respectively. When a working fluid is supplied to and drained from the ports 2*c* to 4*c*, 2*d* to 4*d*, the rods 2*b* to 4*b* move back and forth with respect to the cylinder tubes 2*a* to 4*a*, in other words, the hydraulic cylinders 2 to 4 extend and retract.

The turning motor 5 can rotate to turn a turning body (not illustrated in the drawings). More specifically, the turning motor 5 is a hydraulic motor. This means that the turning motor 5 includes two supply/drain ports 5*c*, 5*d*. When the working fluid is supplied to one supply/drain port 5*c*, the turning motor 5 rotates the turning body in one predetermined rotation direction. When the working fluid is supplied to the other supply/drain port 5*d*, the turning motor 5 rotates the turning body in the other predetermined rotation direction.

<Hydraulic Drive System>

The hydraulic drive system 1 actuates the hydraulic actuators 2 to 5 by supplying and draining the working fluid to and from the hydraulic actuators 2 to 5. More specifically, the hydraulic actuators 2 to 5 are connected to the hydraulic drive system 1 in parallel. In other words, the ports 2*c* to 5*c*, 2*d* to 5*d* of the hydraulic actuators 2 to 5 are individually connected to the hydraulic drive system 1. The hydraulic drive system 1 can supply and drain the working fluid to and from the ports 2*c* to 5*c*, 2*d* to 5*d* of the hydraulic actuators 2 to 5. Thus, it is possible to actuate the hydraulic actuators 2 to 5.

The hydraulic drive system 1 includes a first hydraulic pump 11, a first circuit system 12, a second hydraulic pump 13, a second circuit system 14, a merge valve 15, a plurality of pressure sensors 17, 18, 19R to 21R, 19H to 21H, 22L, 22R, an operation device 23, and a control device 24.

The first hydraulic pump 11 is connected to a drive source. The drive source is an engine E or an electric motor. Note that in the present embodiment, the drive source is the engine E. The first hydraulic pump 11 is rotationally driven by the drive source to discharge the working fluid. Subsequently, the discharged working fluid is primarily supplied to the first circuit system 12. The first hydraulic pump 11 can change a discharge capacity. In the present embodiment, the first hydraulic pump 11 is a swash plate pump or an axial piston pump.

The first circuit system 12 is connected to the first hydraulic pump 11. Furthermore, the arm cylinder 2 and the turning motor 5 are connected in parallel to the first circuit system 12. The first circuit system 12 controls the supply and drainage of the working fluid to and from the arm cylinder 2 and the turning motor 5. More specifically, the first circuit system 12 includes an arm meter-in control valve 31, an arm meter-out control valve 32, a turning meter-in control valve 33, and a turning meter-out control valve 34.

The arm meter-in control valve 31 which is one example of the first meter-in control valve is connected to the first hydraulic pump 11 and the arm cylinder 2. The arm meter-in control valve 31 controls the meter-in flow rate of the working fluid that flows from the first hydraulic pump 11 to the arm cylinder 2. More specifically, the arm meter-in control valve 31 is connected to the first hydraulic pump 11 via a first pump passage 11*a*. Furthermore, the arm meter-in control valve 31 is connected to the rod-end port 2*c* of the arm cylinder 2 via a rod-end passage 2*e* and is connected to the head-end port 2*d* of the arm cylinder 2 via a head-end passage 2*f*. The arm meter-in control valve 31 can control, according to an input arm meter-in command, the direction and the meter-in flow rate of the working fluid that is supplied from the first hydraulic pump 11 to the arm cylinder 2. Specifically, the arm meter-in control valve 31 can supply the working fluid from the first hydraulic pump 11 to one of the ports 2*c*, 2*d* of the arm cylinder 2 and control the meter-in flow rate. In the present embodiment, the arm meter-in control valve 31 is an electronically controlled spool valve that drives a spool such as an electromagnetic proportional control valve and an electric actuator. Specifically, by moving a spool 31*a* on the basis of the arm meter-in command, the arm meter-in control valve 31 switches a direction in which the working fluid flows, and controls the opening degree of the arm meter-in control valve 31.

The arm meter-out control valve 32 which is one example of the first meter-out control valve is connected to the arm cylinder 2 and a tank 10. The arm meter-out control valve 32 controls the meter-out flow rate of the working fluid that is drained from the arm cylinder 2 into the tank 10. More specifically, the arm meter-out control valve 32 is provided so as to be paired with the arm meter-in control valve 31. Furthermore, the arm meter-out control valve 32 is connected to each of the rod-end passage 2*e* and the head-end passage 2*f* so as to be in parallel with the corresponding arm meter-in control valve 31. The arm meter-out control valve 32 can control, according to an input arm meter-out command, the direction and the meter-out flow rate of the working fluid that is drained from the arm cylinder 2 into the tank 10. Specifically, the arm meter-out control valve 32 connects, to the tank 10, the port 2*d* or 2*c* that is different from the port 2*c* or 2*d* to which the arm meter-in control valve 31 is connected, and controls the meter-out flow rate. Note that the arm meter-out control valve 32 can control the meter-out flow rate of the working fluid flowing through the arm meter-out control valve 32 independently from the meter-in flow rate of the working fluid flowing to the arm cylinder 2 via the arm meter-in control valve 31. More specifically, the arm meter-out control valve 32 and the arm meter-in control valve 31 are configured so that the spools thereof move differently. Therefore, the arm meter-out control valve 32 and the arm meter-in control valve 31 can be individually controlled. In the present embodiment, the arm meter-out control valve 32 is an electronically controlled spool valve. Specifically, the arm meter-out control valve 32 moves a spool 32*a* on the basis of the arm meter-out command. By moving the spool 32*a*, the arm meter-out control valve 32 switches a direction in which the working fluid flows, and controls the opening degree of the arm meter-out control valve 32.

The turning meter-in control valve 33 is connected to the first hydraulic pump 11 so as to be in parallel with the arm meter-in control valve 31 and is connected to the turning motor 5. Furthermore, the turning meter-in control valve 33 controls the meter-in flow rate of the working fluid that flows from the first hydraulic pump 11 to the turning motor 5.

More specifically, the turning meter-in control valve 33 is connected to the first pump passage 11*a* so as to be in parallel with the arm meter-in control valve 31. The turning meter-in control valve 33 is connected to the first supply/drain port 5*c* of the turning motor 5 via a first turning passage 5*e* and is connected to the second supply/drain port 5*d* of the turning motor 5 via a second turning passage 5*f*. The turning meter-in control valve 33 can control, according to an input turning meter-in command, the direction and the meter-in flow rate of the working fluid that is supplied from the first hydraulic pump 11 to the turning motor 5. In the present embodiment, the turning meter-in control valve 33 is an electronically controlled spool valve. Specifically, by moving a spool 33*a* on the basis of the turning meter-in command, the turning meter-in control valve 33 switches a direction in which the working fluid flows, and controls the opening degree of the turning meter-in control valve 33.

The turning meter-out control valve 34 is connected to the turning motor 5 and the tank 10. The turning meter-out control valve 34 controls the meter-out flow rate of the working fluid that is drained from the turning motor 5 into the tank 10. More specifically, the turning meter-out control valve 34 is provided so as to be paired with the turning meter-in control valve 33. Furthermore, the turning meter-out control valve 34 is connected to each of the first turning passage 5*e* and the second turning passage 5*f* so as to be in parallel with the corresponding turning meter-in control valve 33. The turning meter-out control valve 34 can control, according to an input turning meter-out command, the direction and the flow rate (meter-out flow rate) of the working fluid that is drained from the turning motor 5 into the tank 10. Note that the turning meter-out control valve 34 can control the meter-out flow rate of the working fluid flowing through the turning meter-out control valve 34 independently from the meter-in flow rate of the working fluid flowing to the turning motor 5 via the turning meter-in control valve 33. More specifically, the turning meter-out control valve 34 and the turning meter-in control valve 33 are configured so that the spools thereof move differently. Therefore, the turning meter-out control valve 34 and the turning meter-in control valve 33 can be individually controlled. In the present embodiment, the turning meter-out control valve 34 is an electronically controlled spool valve. By moving a spool 34*a* on the basis of the turning meter-out command, the turning meter-out control valve 34 can switch a direction in which the working fluid flows, and control the opening degree of the turning meter-out control valve 34.

Similar to the first hydraulic pump 11, the second hydraulic pump 13 is connected to a drive source. Specifically, the second hydraulic pump 13 is rotationally driven by the drive source to discharge the working fluid. Subsequently, the discharged working fluid is primarily supplied to the second circuit system 14. The second hydraulic pump 13 can also change a discharge capacity. In the present embodiment, the second hydraulic pump 13 is a swash plate pump or an axial piston pump. The drive source for the second hydraulic pump 13 and the drive source for the first hydraulic pump 11 may be the same or may be different.

The second circuit system 14 is connected to the second hydraulic pump 13. Furthermore, the boom cylinder 3 and the bucket cylinder 4 are connected in parallel to the second circuit system 14. The second circuit system 14 controls the supply and drainage of the working fluid to and from the boom cylinder 3 and the bucket cylinder 4. More specifically, the second circuit system 14 includes a boom meter-in control valve 35, a boom meter-out control valve 36, a bucket meter-in control valve 37, and a bucket meter-out control valve 38.

The boom meter-in control valve 35 which is one example of the second meter-in control valve is connected to the second hydraulic pump 13 and the boom cylinder 3. Furthermore, the boom meter-in control valve 35 controls the meter-in flow rate of the working fluid that flows from the second hydraulic pump 13 to the boom cylinder 3. More specifically, the boom meter-in control valve 35 is connected to the second hydraulic pump 13 via a second pump passage 13*a*. Furthermore, the boom meter-in control valve 35 is connected to the rod-end port 3*c* of the boom cylinder 3 via a rod-end passage 3*e* and is connected to the head-end port 3*d* of the boom cylinder 3 via a head-end passage 3*f*. The boom meter-in control valve 35 can control, according to an input boom meter-in command, the direction and the meter-in flow rate of the working fluid that is supplied from the second hydraulic pump 13 to the boom cylinder 3. Specifically, the boom meter-in control valve 35 can supply the working fluid from the second hydraulic pump 13 to one of the ports 3*c*, 3*d* of the boom cylinder 3 and control the meter-in flow rate. In the present embodiment, the boom meter-in control valve 35 is an electronically controlled spool valve. Specifically, by moving a spool 35*a* on the basis of the boom meter-in command, the boom meter-in control valve 35 switches a direction in which the working fluid flows, and controls the opening degree of the boom meter-in control valve 35.

The boom meter-out control valve 36 which is one example of the second meter-out control valve is connected to the boom cylinder 3 and the tank 10. The boom meter-out control valve 36 controls the meter-out flow rate of the working fluid that is drained from the boom cylinder 3 into the tank 10. More specifically, the boom meter-out control valve 36 is provided so as to be paired with the boom meter-in control valve 35. Furthermore, the boom meter-out control valve 36 is connected to each of the rod-end passage 3*e* and the head-end passage 3*f* so as to be in parallel with the corresponding boom meter-in control valve 35. The boom meter-out control valve 36 can control, according to an input boom meter-out command, the direction and the meter-out flow rate of the working fluid that is drained from the boom cylinder 3 into the tank 10. Specifically, the boom meter-out control valve 36 connects, to the tank 10, the port 3*d* or 3*c* that is different from the port 3*c* or 3*d* to which the boom meter-in control valve 35 is connected, and controls the meter-out flow rate. Note that the boom meter-out control valve 36 can control the meter-out flow rate of the working fluid flowing through the boom meter-out control valve 36 independently from the meter-in flow rate of the working fluid flowing to the boom cylinder 3 via the boom meter-in control valve 35. More specifically, the boom meter-out control valve 36 and the boom meter-in control valve 35 are configured so that the spools thereof move differently. Therefore, the boom meter-out control valve 36 and the boom meter-in control valve 35 can be individually controlled. In the present embodiment, the boom meter-out control valve 36 is an electronically controlled spool valve. By moving a spool 36*a* on the basis of the boom meter-out command, the boom meter-out control valve 36 can switch a direction in which the working fluid flows, and control the opening degree of the boom meter-out control valve 36.

The bucket meter-in control valve 37 is connected to the second hydraulic pump 13 so as to be in parallel with the boom meter-in control valve 35 and is connected to the bucket cylinder 4. The bucket meter-in control valve 37 controls the meter-in flow rate of the working fluid that flows from the second hydraulic pump 13 to the bucket cylinder 4. More specifically, the bucket meter-in control valve 37 is connected to the second pump passage 13*a* so as to be in parallel with the boom meter-in control valve 35. The bucket meter-in control valve 37 is connected to the rod-end port 4*c* of the bucket cylinder 4 via a rod-end passage 4*e* and is connected to a head-end port 4*d* of the bucket cylinder 4 via a head-end passage 4*f*. The bucket meter-in control valve 37 can control, according to an input bucket meter-in command, the direction and the meter-in flow rate of the working fluid that is supplied from the second hydraulic pump 13 to the bucket cylinder 4. In the present embodiment, the bucket meter-in control valve 37 is an electronically controlled spool valve. Specifically, by moving a spool 37*a* on the basis of the bucket meter-in command, the bucket meter-in control valve 37 switches a direction in which the working fluid flows, and controls the opening degree of the bucket meter-in control valve 37.

The bucket meter-out control valve 38 is connected to the bucket cylinder 4 and the tank 10. The bucket meter-out control valve 38 controls the meter-out flow rate of the working fluid that is drained from the bucket cylinder 4 into the tank 10. More specifically, the bucket meter-out control valve 38 is provided so as to be paired with the bucket meter-in control valve 37. Furthermore, the bucket meter-out control valve 38 is connected to each of the rod-end passage 4*e* and the head-end passage 4*f* so as to be in parallel with the corresponding bucket meter-in control valve 37. Moreover, the bucket meter-out control valve 38 can control, according to an input bucket meter-out command, the direction and the meter-out flow rate of the working fluid that is drained from the bucket cylinder 4 into the tank 10. Note that the bucket meter-out control valve 38 can also control the meter-out flow rate of the working fluid flowing through the bucket meter-out control valve 38 independently from the meter-in flow rate of the working fluid flowing to the bucket cylinder 4 via the bucket meter-in control valve 37. More specifically, the bucket meter-out control valve 38 and the bucket meter-in control valve 37 are configured so that the spools thereof move differently. Therefore, the bucket meter-out control valve 38 and the bucket meter-in control valve 37 can be individually controlled. In the present embodiment, the bucket meter-out control valve 38 is an electronically controlled spool valve. By moving a spool 38*a* on the basis of the bucket meter-out command, the bucket meter-out control valve 38 can switch a direction in which the working fluid flows, and control the opening degree of the bucket meter-out control valve 38.

The merge valve 15 opens and closes a merge passage 15*a*. The merge passage 15*a* connects the first hydraulic pump 11 and the second hydraulic pump 13. More specifically, the merge passage 15*a* is connected to the first and second pump passages 11*a*, 13*a*. In the present embodiment, the merge passage 15*a* is connected to a portion of the first pump passage 11*a* that is located upstream of the hydraulic actuators 2, 5 and is connected to a portion of the second pump passage 13*a* that is located upstream of the hydraulic actuators 3, 4. The merge passage 15*a* causes the working fluid discharged from the first hydraulic pump 11 to flow into the second pump passage 13*a* and further causes the working fluid discharged from the second hydraulic pump 13 to flow into the first pump passage 11*a*. The merge valve 15 is located in the merge passage 15*a*. The merge valve 15 opens and closes the merge passage 15*a* on the basis of an input merge command. Furthermore, the merge valve 15 can control the opening degree of the merge valve 15 on the basis of the input merge command. In the present embodiment, the merge valve 15 is an electromagnetic proportional control valve.

Each of the plurality of pressure sensors 17, 18, 19R to 21R, 19H to 21H, 22L, 22R measures a pressure of the working fluid flowing through a point. Subsequently, each of the plurality of pressure sensors 17, 18, 19R to 21R, 19H to 21H, 22L, 22R outputs the measured pressure to the control device 24. More specifically, the first discharge pressure sensor 17 and the second discharge pressure sensor 18 are connected to the first pump passage 11*a* and the second pump passage 13*a*, respectively. The first discharge pressure sensor 17 and the second discharge pressure sensor 18 measure a discharge pressure of the first hydraulic pump 11 and a discharge pressure of the second hydraulic pump 13, respectively. The rod-end pressure sensors 19R to 21R are connected to the rod-end passages 2*e* to 4*e*, respectively. The rod-end pressure sensors 19R to 21R measure pressures (rod pressures) at the rod-end ports 2*c* to 4*c* of the arm cylinder 2, the boom cylinder 3, and the bucket cylinder 4. The head-end pressure sensors 19H to 21H are connected to the head-end passages 2*f* to 4*f*, respectively. The head-end pressure sensors 19H to 21H measure pressures (head pressures) at the head-end ports 2*d* to 4*d* of the arm cylinder 2, the boom cylinder 3, and the bucket cylinder 4. The first turning pressure sensor 22L and the second turning pressure sensors 22R are connected to the first turning passage 5*e* and the second turning passage 5*f*, respectively. The first turning pressure sensor 22L and the second turning pressure sensors 22R measure pressures (port pressures) at the two supply/drain ports 5*c*, 5*d*.

The operation device 23 outputs, to the control device 24, an operation command corresponding to the amount of operation specifying the amount of actuation of each of the hydraulic actuators 2 to 5. In the present embodiment, the operation device 23 is an operation valve or an electric joystick, for example. The operation device 23 includes two operation levers 23*a*, 23*b*. The operation levers 23*a*, 23*b* are configured so as to allow an operator to operate the operation levers 23*a*, 23*b*. The operation levers 23*a*, 23*b* are operation tools, the amount of operation of which specifies the amount of actuation of each of the hydraulic actuators 2 to 5. This means that the operation device 23 outputs, to the control device 24, an operation command corresponding to the amount of operation of the operation levers 23*a*, 23*b*. In the present embodiment, each of the two operation levers 23*a*, 23*b* is configured so as to be able to swing in all 360-degree directions including two orthogonal directions (for example, the depth direction and the width direction). The operation device 23 outputs, to the control device 24, operation commands corresponding to the directions and amounts of operation of the operation levers 23*a*, 23*b*. In the present embodiment, when the first operation lever 23*a* is operated in a first direction as seen in plan view, an arm operation command corresponding to the amount of operation is output, and when the first operation lever 23*a* is operated in a second direction as seen in plan view, a turning operation command corresponding to the amount of operation is output. Furthermore, when the operation lever 23*a* is operated in a diagonal direction as seen in plan view (for example, a direction at an angle $\alpha$ with respect to the first direction as seen in plan view), both the arm operation command and the turning operation command are output. The arm operation command corresponding to a first direction component (that is, the amount of operation in the first direction) included in the amount of operation of the operation lever 23*a* is output, and the turning operation command corresponding to a second direction component included in the amount of operation of the operation lever 23*a* is output. When the second operation lever 23*b* is operated in a third direction, a boom operation command corresponding to the amount of operation is output, and when the second operation lever 23*b* is operated in a fourth direction, a bucket operation command corresponding to the amount of operation is output. When the operation lever 23*b* is operated in a diagonal direction as seen in plan view (for example, a direction at an angle β with respect to the third direction as seen in plan view), both the boom operation command and the bucket operation command are output. The boom operation command corresponding to a third direction component (that is, the amount of operation in the third direction) included in the amount of operation of the operation lever 23*b* is output, and the bucket operation command corresponding to a fourth direction component included in the amount of operation of the operation lever 23*b* is output. The arm operation command is an operation command for actuation of the arm cylinder 2. The turning operation command is an operation command for actuation of the turning motor 5. The boom operation command is an operation command for actuation of the boom cylinder 3. The bucket operation command is an operation command for actuation of the bucket cylinder 4.

The control device 24 is connected to the hydraulic pumps 11, 13, the control valves 31 to 38, the merge valve 15, the pressure sensors 17, 18, 19R to 21R, 19H to 21H, 22L, 22R, and the operation device 23. The control device 24 controls the discharge flow rate at each of the hydraulic pumps 11, 13. In the present embodiment, the control device 24 performs horsepower control on discharge flow rates at the hydraulic pumps 11, 13 on the basis of the pressures measured by the discharge pressure sensors 17, 18. Note that the method for controlling the discharge flow rates at the hydraulic pumps 11, 13 is not limited to the horsepower control and may be load sensing control. Furthermore, the control device 24 controls the opening degrees of the merge valve 15 and the control valves 31 to 38 according to the operation commands from the operation device 23 and the pressures measured by the pressure sensors 17, 18, 19R to 21R, 19H to 21H, 22L, 22R. More specifically, the control device 24 controls the operation of the merge valve 15 according to the operation commands from the operation device 23 and loads on the hydraulic actuators 2 to 5. Specifically, the control device 24 causes the merge valve 15 to open and close the merge passage 15*a* according to the operation commands from the operation device 23 and loads on the hydraulic actuators 2 to 5. This allows the working fluid discharged from one of the first hydraulic pump 11 and the second hydraulic pump 13 to merge with the working fluid discharged from the other. Furthermore, the control device 24 controls the opening degree of the merge valve 15 according to the operation commands from the operation device 23 and loads on the hydraulic actuators 2 to 5. By controlling the opening degree of the merge valve 15, the control device 24 can cause the working fluid to merge at a merge flow rate corresponding to the amount of operation of the operation levers 23*a*, 23*b*. Furthermore, the control device 24 controls the opening degrees of the meter-in control valves 31, 33, 35, 37 to control the meter-in flow rates of the working fluid that is supplied to the hydraulic actuators 2 to 5. Moreover, the control device 24 controls the opening degrees of the meter-out control valves 32, 34, 36, 38 to control the meter-out flow rates of the working fluid that is supplied from the hydraulic actuators 2 to 5.

Figure 2:
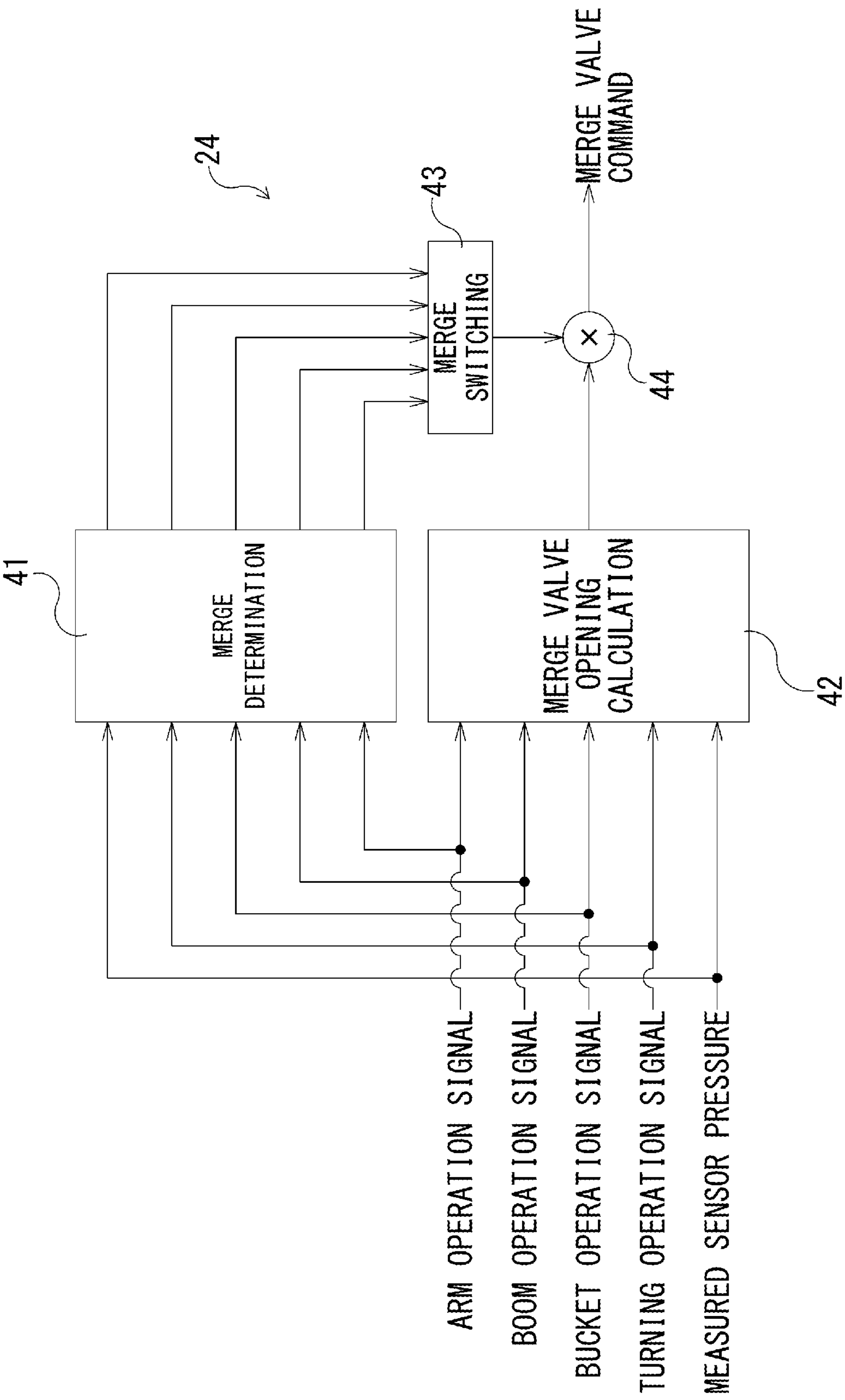
FIG. 2 is a block diagram of a control device included in the hydraulic drive system illustrated in FIG. 1 that is related to the opening degree control on a merge valve.
Figure 3:
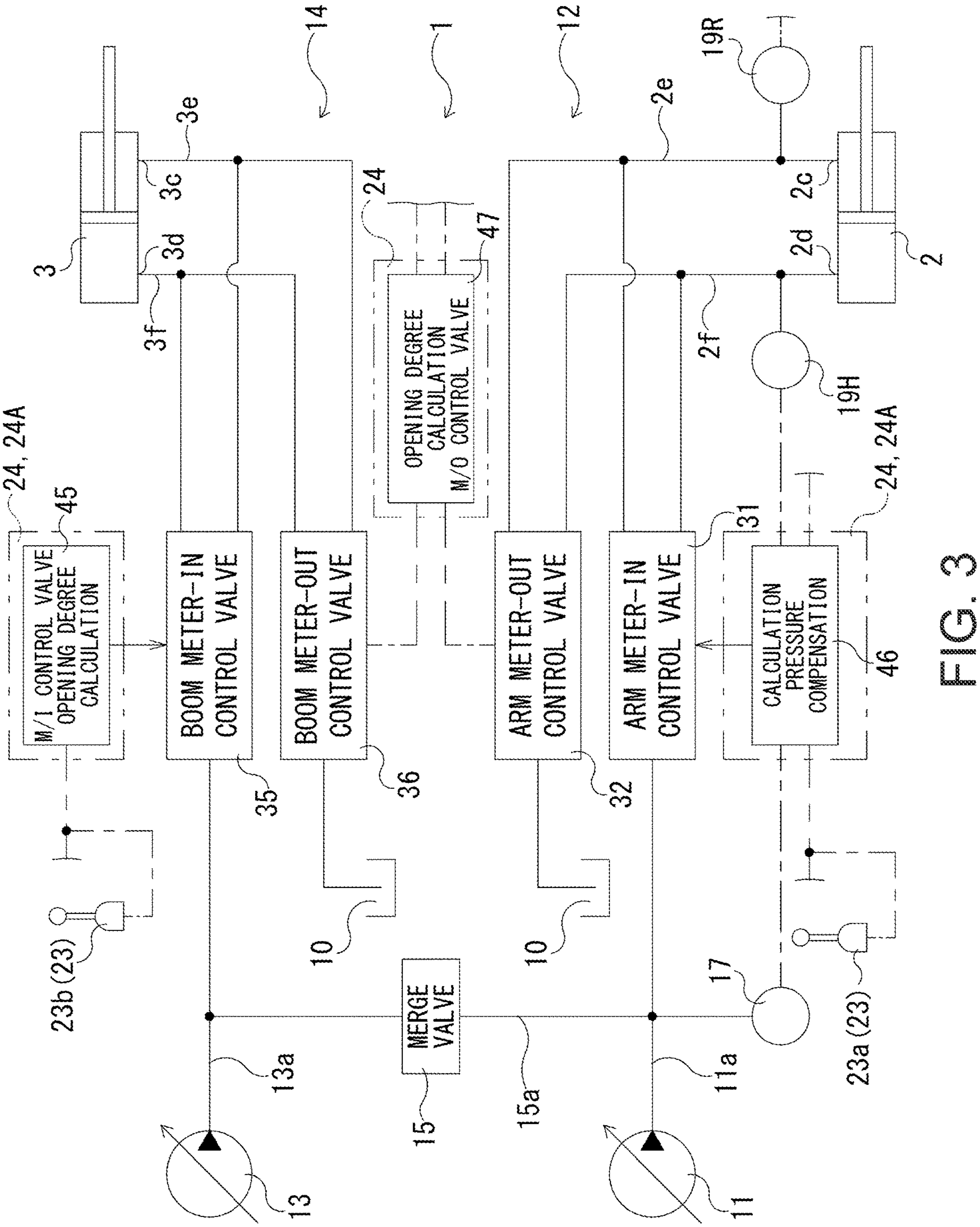
FIG. 3 is a block diagram of a control device included in the hydraulic drive system illustrated in FIG. 1 that is related to the opening degree control on a control valve.

More specifically, the control device 24 includes the following functions to control the operation of the merge valve 15. Specifically, the control device 24 includes a merge determination unit 41, a merge valve opening degree calculator 42, a merge switching unit 43, and a multiplier 44, as illustrated in FIG. 2. Furthermore, the control device 24 includes the following elements to adjust the meter-in flow rate and the meter-out flow rate. Specifically, the control device 24 includes a meter-in control valve opening degree calculator (M/I control valve opening degree calculator) 45, a pressure compensation M/I control valve opening degree calculator 46, and a meter-out control valve opening degree calculator (M/O control valve opening degree calculator) 47, as illustrated in FIG. 3.

The merge determination unit 41 illustrated in FIG. 2 determines whether or not to cause the working fluid discharged from one of the first hydraulic pump 11 and the second hydraulic pump 13 to merge with the working fluid discharged from the other (that is, whether or not to allow the merging). More specifically, on the basis of the operation commands from the operation device 23 and loads on the hydraulic actuators 2 to 5, the control device 24 determines whether or not merging conditions are satisfied. In the present embodiment, two or more merging conditions corresponding to the actuation statuses of the hydraulic actuators 2 to 5 are set in the control device 24. For example, a first merging condition and a second merging condition are set in the control device 24. The first merging condition (for simultaneous arm and boom operation) is that the amount of operation of the first operation lever 23*a* in the first direction and the amount of operation of the second operation lever 23*b* in the third direction are greater than or equal to a first predetermined amount and a second predetermined amount, respectively, and the load on the arm cylinder 2 is greater than or equal to a predetermined value. The load on the arm cylinder 2 has a value obtained by subtracting a value obtained by multiplying the outflow pressure-receiving area of the arm cylinder 2 by an outflow pressure from a value obtained by multiplying the inflow pressure-receiving area of the arm cylinder 2 by an inflow pressure. The second merging condition (for solo arm operation) is that the amount of operation of the first operation lever 23*a* in the first direction is greater than or equal to a third predetermined amount and the load on the arm cylinder 2 is greater than or equal to the predetermined value. This means that the control device 24 performs merging determination for simultaneous operation of the arm cylinder 2 and the boom cylinder 3 according to the first merging condition, and performs merging determination for sole operation of the arm cylinder 2 according to the second merging condition. In addition, two or more merging conditions that can be determined on the basis of the operation commands from the operation device 23 and loads on the hydraulic actuators 2 to 5 are set in the control device 24. Furthermore, the control device 24 determines whether or not each of the two or more merging conditions including the first merging condition and the second merging condition is satisfied. Note that the merging condition is not limited to those described above and may be set according to solo and combined operations of the operation levers 23*a*, 23*b*. Note that the control device 24 uses the amount of operation of each of the operation levers 23*a*, 23*b* to determine whether or not the two or more merging conditions are satisfied, but may use, as the amount of operation, the pilot pressure applied to each of the spools 31*a* to 38*a* of the control valves 31 to 38.

The merge valve opening degree calculator 42 calculates the opening degree of the merge valve 15. More specifically, two or more mathematical expressions or two or more merge opening degree maps corresponding to the two or more merging conditions described above are set in the merge valve opening degree calculator 42. In the merge opening degree maps or the mathematical expressions, the amount of operation and the opening degree of the merge valve 15 are associated. The merge valve opening degree calculator 42 calculates the opening degree of the merge valve 15 on the basis of the amount of operation and the merge opening degree maps or the mathematical expressions. The merge valve opening degree calculator 42 calculates the opening degree of the merge valve 15 for every merging condition satisfied. Subsequently, the merge valve opening degree calculator 42 selects the largest opening degree from among the calculated opening degrees as the merge opening degree of the merge valve 15.

The merge switching unit 43 selects, according to the result of the determination made by the merge determination unit 41, whether or not the merge command is to be output. More specifically, the merge switching unit 43 outputs a switch factor according to the result of the determination made by the merge determination unit 41. In the present embodiment, the control device 24 switches a merge permission status according to whether the two or more merging conditions are satisfied. Specifically, when the merge permission status is set to a merge-unpermitted status, the merge switching unit 43 outputs a value of 0. On the other hand, when the merge permission status is set to a merge-permitted status according to a switching command, the merge switching unit 43 outputs a value of 1.

The multiplier 44 creates a merge command by multiplying the merge opening degree selected by the merge valve opening degree calculator 42 by the switch factor that is output from the merge switching unit 43. Subsequently, the multiplier 44 outputs the created merge command to the merge valve 15. In this manner, in the merge-permitted status, the opening degree of the merge valve 15 is controlled according to the result from the merge determination unit 41. On the other hand, in the merge-unpermitted status, the merge valve 15 keeps the merge passage 15*a* closed.

The M/I control valve opening degree calculator 45 illustrated in FIG. 3 calculates the opening degrees of the meter-in control valves 33, 35, 37 on the basis of the operation commands from the operation device 23. More specifically, the M/I control valve opening degree calculator 45 holds a mathematical expression or an opening degree map representing the relationship between each operation command and the opening degrees of the meter-in control valves 33, 35, 37 corresponding to the operation command. The M/I control valve opening degree calculator 45 calculates the opening degrees of the meter-in control valves 33, 35, 37 on the basis of the obtained operation command and the mathematical expression or the opening degree map. The M/I control valve opening degree calculator 45 outputs the meter-in commands corresponding to the calculated opening degrees to the corresponding meter-in control valves 33, 35, 37. Thus, the M/I control valve opening degree calculator 45 controls the opening degrees of the meter-in control valves 33, 35, 37 and supplies the working fluid to the corresponding hydraulic actuators 3 to 5 at the meter-in flow rates based on the operation commands from the operation device 23.

The pressure compensation M/I control valve opening degree calculator (hereinafter referred to as "the pressure compensation calculator") 46 calculates the opening degree of the arm meter-in control valve 31 on the basis of the arm operation command from the operation device 23 and the upstream-downstream pressure of the arm meter-in control valve 31. The upstream-downstream pressure of the arm meter-in control valve 31 is a pressure difference between the discharge pressure detected by the first discharge pressure sensor 17 and the inflow pressure of the arm cylinder 2 detected by the rod-end pressure sensor 19R or the head-end pressure sensor 19H (an inflow pressure sensor). More specifically, the pressure compensation calculator 46 holds a mathematical expression or a flow rate map representing the relationship between the arm operation command and the meter-in flow rate. Subsequently, the pressure compensation calculator 46 calculates an arm target meter-in flow rate on the basis of the obtained arm operation command and the flow rate map or the mathematical expression. The arm target meter-in flow rate is a target value of the meter-in flow rate for the arm cylinder 2. Next, the pressure compensation calculator 46 calculates the upstream-downstream pressure of the arm meter-in control valve 31 on the basis of the first discharge pressure sensor 17, the rod-end pressure sensor 19R, and the head-end pressure sensor 19H. Subsequently, the pressure compensation calculator 46 calculates the opening degree of the arm meter-in control valve 31 on the basis of the calculated upstream-downstream pressure, the target meter-in flow rate, and the mathematical expression (for example, Bernoulli's principle). The pressure compensation calculator 46 outputs, to the arm meter-in control valve 31, the arm meter-in command corresponding to the calculated opening degree. Thus, the pressure compensation calculator 46 can perform pressure compensation on the meter-in flow rate for the arm cylinder 2. Therefore, the working fluid can be supplied to the arm cylinder 2 at the target meter-in flow rate based on the arm operation command. Furthermore, by performing the pressure compensation, it is possible to secure the meter-in flow rate of the working fluid flowing to other hydraulic actuators 3 to 5 that are simultaneously operated.

The M/O control valve opening degree calculator 47 calculates the opening degrees of the meter-out control valves 32, 34, 36, 38 on the basis of the operation commands from the operation device 23. Subsequently, the M/O control valve opening degree calculator 47 outputs the meter-out commands corresponding to the calculated opening degrees to the corresponding meter-out control valves 32, 34, 36, 38. Thus, the opening degrees of the meter-out control valves 32, 34, 36, 38 are controlled, and the working fluid is drained from the hydraulic actuators 2 to 5 at the meter-out flow rates based on the operation commands from the operation device 23.

<Operation of Hydraulic Drive System>

In the hydraulic drive system 1, when the operation levers 23*a*, 23*b* are operated, the operation commands corresponding to the directions of operation and the amounts of operation are output from the operation device 23 to the control device 24. The M/I control valve opening degree calculator 45 and the pressure compensation calculator 46 output the meter-in commands to the meter-in control valves 31, 33, 35, 37 on the basis of the operation commands. The M/O control valve opening degree calculator 47 outputs the meter-out commands to the meter-out control valves 32, 34, 36, 38 on the basis of the operation commands. Thus, the working fluid is supplied to one ports 2*c* to 5*c*, 2*d* to 5*d* of the hydraulic actuators 2 to 5 at the meter-in flow rates based on the operation commands, and the working fluid is supplied to the other ports 2*d* to 5*d*, 2*c* to 5*c* at the meter-out flow rates based on the operation commands. Therefore, the hydraulic actuators 2 to 5 are actuated at speeds based on the operation commands.

Furthermore, in the hydraulic drive system 1, when any of the merging conditions described above is satisfied, the working fluid flowing from the two hydraulic pumps 11, 13 merge. More specifically, the control device 24 determines, on the basis of the operation commands that are output from the operation device 23, whether or not any of the merging conditions is satisfied. The following describes the case where the first operation lever 23*a* is operated in the first direction and simultaneously the second operation lever 23*b* is operated in the third direction to simultaneously actuate the arm cylinder 2 and the boom cylinder 3, for example.

First, the merge determination unit 41 of the control device 24 determines, on the basis of the arm operation command and the boom operation command, whether or not the first merging condition is satisfied. When the amount of operation of the first operation lever 23*a* in the first direction is greater than or equal to the first operation amount, the amount of operation of the second operation lever 23*b* in the third direction is greater than or equal to the second operation amount, and any of the pressures measured by the sensors 19H, 19R is greater than or equal to a predetermined pressure, the merge determination unit 41 determines that the first merging condition is satisfied. Furthermore, the merge determination unit 41 determines, on the basis of the arm operation command, whether or not the second merging condition is satisfied. When the amount of operation of the second operation lever 23*b* in the third direction is greater than or equal to the third operation amount and the load on the arm cylinder 2 is greater than or equal to a predetermined value, the merge determination unit 41 determines that the second merging condition is satisfied. Subsequently, when at least one of the merging conditions is satisfied, the merge switching unit 43 outputs a value of 1 to the multiplier 44 as the switch factor.

Next, the merge valve opening degree calculator 42 calculates the opening degrees of the merge valve 15 on the basis of the mathematical expressions or the merge opening degree maps that correspond to the merging conditions satisfied. Subsequently, the merge valve opening degree calculator 42 selects the largest opening degree from among the calculated opening degrees as the merge opening degree. Specifically, the merge valve opening degree calculator 42 calculates two opening degrees on the basis of the mathematical expressions or the merge opening degree maps that correspond to the first merging condition and the second merging condition. Subsequently, the merge valve opening degree calculator 42 selects a larger opening degree from among the two opening degrees as the merge opening degree. The multiplier 44 outputs a merge command obtained by multiplying the selected merge opening degree by the switch factor that is output from the merge switching unit 43. When the merge permission status is set to the merge-permitted status according to the switching command, the merge command is output to the merge valve 15. Thus, the merge valve 15 opens the merge passage 15*a*. This makes it possible to merge the working fluid from the first hydraulic pump 11 and the working fluid from the second hydraulic pump 13. This means that the working fluid can be supplied to the hydraulic cylinders 2, 3 (in the present embodiment, the boom cylinder 3) at a meter-in flow rate exceeding the maximum discharge flow rate at one hydraulic pump 11 or 13. In the present embodiment, the maximum discharge flow rate is the maximum value of a flow rate at which each of the hydraulic pumps 11, 13 under horsepower control is capable of discharging the working fluid. Specifically, the maximum discharge flow rates at the hydraulic pumps 11, 13 are calculated on the basis of the horsepower curves for the hydraulic pumps 11, 13 and the discharge pressures of the hydraulic pumps 11, 13. Note that the maximum discharge flow rate is not limited to the aforementioned maximum value and may be the maximum value of a discharge flow rate restricted by other control.

The M/I control valve opening degree calculator 45 controls the opening degree of the boom meter-in control valve 35 on the basis of the boom operation command from the operation device 23 and the opening degree map or the mathematical expression. Thus, the working fluid is supplied to the boom cylinder 3 at the meter-in flow rate based on the boom operation command. Specifically, the boom cylinder 3 is actuated at a speed corresponding to the amount of operation of the operation lever 23*b* in the third direction. Meanwhile, the pressure compensation calculator 46 controls the opening degree of the arm meter-in control valve 31 on the basis of the arm operation command from the operation device 23 and the upstream-downstream pressure of the arm meter-in control valve 31. Specifically, while performing pressure compensation, the pressure compensation calculator 46 supplies the working fluid to the arm cylinder 2 at the meter-in flow rate based on the arm operation command. Furthermore, the M/O control valve opening degree calculator 47 controls the opening degree of each of the meter-out control valves 32, 36 on the basis of the arm operation command and the boom operation command from the operation device 23. Thus, it is possible to drain the working fluid from the arm cylinder 2 at the meter-out flow rate based on the arm operation command and drain the working fluid from the boom cylinder 3 at the meter-out flow rate based on the boom operation command.

In the hydraulic drive system 1, when the load on the arm cylinder 2 is less than the load on the boom cylinder 3, the control device 24 controls the opening degree of the arm meter-in control valve 31 and can thereby restrict the flow rate of the working fluid flowing to the arm cylinder 2. This allows elimination of the pressure compensation valve that is to be provided for the arm cylinder 2; thus, it is possible to reduce energy consumption when the arm cylinder 2 and the boom cylinder 3 are simultaneously operated. In the present embodiment, the fuel consumption of the engine E can be improved.

More specifically, in the hydraulic drive system 1, the opening degree of the arm meter-in control valve 31 of the arm cylinder 2 and the opening degree of the arm meter-out control valve 32 of the arm cylinder 2 can be controlled separately. In other words, the control device 24 can maintain the opening degree of the arm meter-out control valve 32 at the opening degree based on the arm operation command, and control the opening degree of the arm meter-in control valve 31 according to the opening or closing of the merge passage 15*a* and the arm operation command. Thus, using the arm meter-in control valve 31, the pressure compensation can be performed on the meter-in flow rate of the working fluid flowing to the arm cylinder 2. Therefore, even in the state where the merge passage 15*a* is open, the arm cylinder 2 can be actuated at a speed corresponding to the amount of operation of the first operation lever 23*a* in the first direction, and the boom cylinder 3 can be actuated at a speed corresponding to the amount of operation of the second operation lever 23*b* in the third direction.

Furthermore, in the hydraulic drive system 1, by merging the working fluid from the hydraulic pump 11 and the working fluid from the hydraulic pump 13, it is possible to supply the working fluid to the hydraulic cylinders 2, 3 at a meter-in flow rate exceeding the maximum discharge flow rate at one hydraulic pump 11 or 13. Thus, the first hydraulic pump 11 and the second hydraulic pump 13 can be downsized.

More specifically, by controlling the opening degree of the boom meter-in control valve 35, the control device 24 can secure the flow rate of the working fluid flowing to the boom cylinder 3. In other words, in the hydraulic drive system 1, the opening degree of the boom meter-in control valve 35 of the boom cylinder 3 and the opening degree of the boom meter-out control valve 36 of the boom cylinder 3 can also be controlled separately. This means that while maintaining the opening degree of the boom meter-out control valve 36 in order to secure the meter-out flow rate, it is possible to change the opening degree of the boom meter-in control valve 35 in order to adjust the meter-in flow rate. Thus, even when the merge passage 15*a* opens and the working fluid is supplied to the second pump passage 13*a* at a high flow rate, the boom cylinder 3 can be actuated at a speed corresponding to the amount of operation of the second operation lever 23*b* in the third direction. This means that in the case where the arm cylinder 2 and the boom cylinder 3 are simultaneously operated, both the arm cylinder 2 and the boom cylinder 3 can be actuated at speeds corresponding to the respective amounts of operation.

Furthermore, in the hydraulic drive system 1, in the case where the arm cylinder 2 and the boom cylinder 3 are simultaneously operated, the opening degree of the merge valve 15 is controlled according to the amounts of operation of the two operation levers 23*a*, 23*b*. Thus, an appropriate amount of the working fluid can flow from the first hydraulic pump 11 to the second circuit system 14 (or from the second hydraulic pump 13 to the first circuit system 12). Thus, in the second circuit system 14 (or the first circuit system 12), the flow rate of the working fluid can be lowered to keep the working fluid from flowing to the actuators 4, 5 (or the actuators 2, 3) at a higher flow rate than necessary. For example, in the case where the arm cylinder 2 and the boom cylinder 3 are simultaneously operated, the opening degree of the boom meter-in control valve 35 can be set to be large when an appropriate amount of the working fluid flows to the second circuit system 14. Thus, it is possible to reduce energy consumption by reducing the opening degree of the boom meter-in control valve 35. In other words, the pressure loss at the boom meter-in control valve 35 can be reduced, and the energy consumption in the second circuit system 14 can be reduced.

Furthermore, in the hydraulic drive system 1, the pressure compensation calculator 46 controls the opening degree of the arm meter-in control valve 31 on the basis of the upstream-downstream pressure of the arm meter-in control valve 31 and the target meter-in flow rate based on the arm operation command. In other words, the pressure compensation calculator 46 performs the pressure compensation on the meter-in flow rate for the arm cylinder 2. Therefore, the working fluid can be supplied to the arm cylinder 2 at a flow rate corresponding to the amount of operation of each of the two operation levers 23*a*, 23*b* simultaneously operated. Thus, the impact that the simultaneous operation has on the operability of the arm cylinder 2 can be reduced. Furthermore, in the hydraulic drive system 1, when there is a large difference between the load on the arm cylinder 2 and the load on the boom cylinder 3, the flow rate of the working fluid flowing to the boom cylinder 3 is reduced. Therefore, performing the opening degree control on the arm meter-in control valve 31 by the pressure compensation calculator 46 so as to reduce the meter-in flow rate for the arm cylinder 2 is particularly useful in the hydraulic drive system 1.

Furthermore, in the hydraulic drive system 1, when the discharge flow rate at the second hydraulic pump 13 is insufficient with respect to the meter-in flow rate based on the boom operation command, the control device 24 can open the merge valve 15 to merge the working fluid from the first hydraulic pump 11 with the working fluid from the second hydraulic pump 13 via the merge valve 15. Thus, the meter-in flow rate based on the boom operation command can be secured for the boom cylinder 3. On the other hand, when a sufficient flow rate can be secured by the second hydraulic pump 13 for the meter-in flow rate based on the boom operation command, the merge valve 15 can close the merge passage 15*a* to reduce energy consumption. In the present embodiment, the fuel consumption of the engine E can be improved.

Embodiment 2

A hydraulic drive system 1A according to Embodiment 2 is similar in configuration to the hydraulic drive system 1 according to Embodiment 1. Therefore, the configuration of the hydraulic drive system 1A according to Embodiment 2 will be described focusing on differences from the hydraulic drive system 1 according to Embodiment 1; elements that are the same as those of the hydraulic drive system 1 according to Embodiment 1 share the same reference signs, and as such, description of the elements will be omitted.

The hydraulic drive system 1A according to Embodiment 2 includes the first hydraulic pump 11, the first circuit system 12, the second hydraulic pump 13, the second circuit system 14, the merge valve 15, the plurality of pressure sensors 17, 18, 19R to 21R, 19H to 21H, 22L, 22R, the operation device 23, and a control device 24A, as illustrated in FIG. 1.

The control device 24A has substantially the same functions as the control device 24 according to Embodiment 1. Furthermore, the control device 24A controls the opening degree of the merge valve 15 as follows. Specifically, the control device 24A controls the opening degree of the merge valve 15 on the basis of a first flow rate difference which is a difference between a first total flow rate and the maximum discharge flow rate at the first hydraulic pump 11 or a second flow rate difference which is a difference between a second total flow rate and the maximum discharge flow rate at the second hydraulic pump 13. The first total flow rate is the total of target meter-in flow rates (hereinafter referred to as "the target M/I flow rates") of the working fluid that is supplied from the first circuit system 12 to the hydraulic actuators 2, 5. The second total flow rate is the total of the target M/I flow rates of the working fluid that is supplied from the second circuit system 14 to the hydraulic actuators 3, 4. The target M/I flow rates at the hydraulic actuators 2 to 5 are target values of the meter-in flow rates at the hydraulic actuators 2 to 5.

Figure 4:
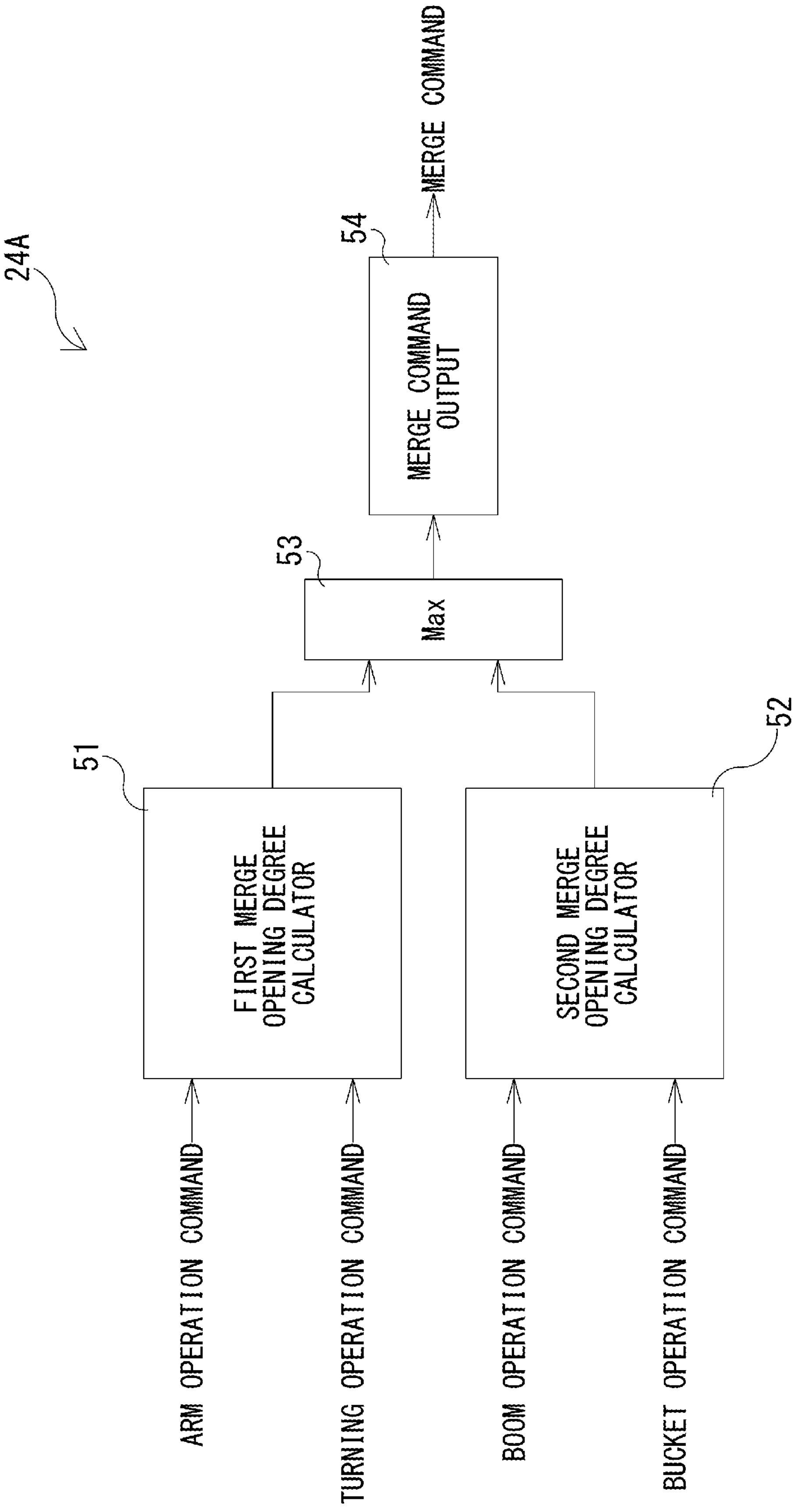
FIG. 4 is a block diagram of a control device included in a hydraulic drive system according to Embodiment 2 of the present invention that is related to the opening degree control on a merge valve.

More specifically, the control device 24A includes a first merge opening degree calculator 51, a second merge opening degree calculator 52, a merge opening degree selector 53, and a merge command output unit 54, as illustrated in FIG. 4. The first merge opening degree calculator 51 calculates, on the basis of the first flow rate difference, a first merge opening degree which is the opening degree of the merge valve 15. More specifically, the first merge opening degree calculator 51 calculates an arm target M/I flow rate (the target M/I flow rate at the arm cylinder 2) on the basis of the map or the mathematical expression for the arm and the arm operation command. Furthermore, the first merge opening degree calculator 51 calculates a turning target M/I flow rate (the target M/I flow rate at the turning motor 5) on the basis of the map or the mathematical expression for turning and the turning operation command. Subsequently, the first merge opening degree calculator 51 calculates the first total flow rate by adding up the calculated arm target M/I flow rate and the calculated turning target M/I flow rate. Moreover, the first merge opening degree calculator 51 calculates the maximum discharge flow rate at the first hydraulic pump 11 on the basis of the horsepower curve for the first hydraulic pump 11 and the discharge pressure measured by the first discharge pressure sensor 17. Subsequently, the first merge opening degree calculator 51 subtracts the first total flow rate from the maximum discharge flow rate at the first hydraulic pump 11 (in other words, calculates the first flow rate difference). Subsequently, the first merge opening degree calculator 51 calculates the first merge opening degree on the basis of the opening degree map and the first flow rate difference.

The second merge opening degree calculator 52 calculates a second merge opening degree which is the opening degree of the merge valve 15 on the basis of the second flow rate difference by substantially the same method as the calculation method used by the first merge opening degree calculator 51. More specifically, the second merge opening degree calculator 52 calculates a boom target M/I flow rate (the target M/I flow rate at the boom cylinder 3) on the basis of the map or the mathematical expression for the boom and the boom operation command. Furthermore, the second merge opening degree calculator 52 calculates a bucket target M/I flow rate (the target M/I flow rate at the bucket cylinder 4) on the basis of the map or the mathematical expression for the bucket and the bucket operation command. The second merge opening degree calculator 52 calculates the second total flow rate by adding up the calculated boom target M/I flow rate and the calculated bucket target M/I flow rate. Moreover, the second merge opening degree calculator 52 calculates the maximum discharge flow rate at the second hydraulic pump 13 on the basis of the horsepower curve for the second hydraulic pump 13 and the discharge pressure measured by the second discharge pressure sensor 18. Subsequently, the second merge opening degree calculator 52 subtracts the second total flow rate from the maximum discharge flow rate at the second hydraulic pump 13 (in other words, calculates the second flow rate difference). Subsequently, the second merge opening degree calculator 52 calculates the second merge opening degree on the basis of the opening degree map and the second flow rate difference.

The merge opening degree selector 53 selects one of the first merge opening degree calculated at the first merge opening degree calculator 51 and the second merge opening degree calculated at the second merge opening degree calculator 52. More specifically, the merge opening degree selector 53 selects the larger one of the first merge opening degree and the second merge opening degree.

The merge command output unit 54 outputs the merge command on the basis of the merge opening degree selected by the merge opening degree selector 53. More specifically, the merge command output unit 54 holds a command map representing the relationship between the merge opening degree and the merge command. The merge command output unit 54 creates the merge command on the basis of the selected merge opening degree and the command map. Subsequently, the merge command output unit 54 outputs the created merge command to the merge valve 15. Thus, the opening degree of the merge valve 15 is controlled on the basis of the first flow rate difference or the second flow rate difference.

<Operation of Hydraulic Drive System>

When the operation levers 23*a*, 23*b* are operated, the control device 24A included in the hydraulic drive system 1A controls the meter-in control valves 31, 33, 35, 37 on the basis of the operation commands and also controls the opening degree of the merge valve 15. Specifically, in the control device 24A, the first merge opening degree calculator 51 calculates the first merge opening degree, and the second merge opening degree calculator 52 calculates the second merge opening degree. Subsequently, the merge opening degree selector 53 selects the larger one of the first merge opening degree calculated and the second merge opening degree calculated. Furthermore, the merge command output unit 54 outputs, to the merge valve 15, the merge command corresponding to the selected merge opening degree.

For example, when the operation levers 23*a*, 23*b* are operated, the first total flow rate is greater than or equal to the maximum discharge flow rate at the first hydraulic pump 11, and the first merge opening degree is greater than the second merge opening degree, the merge opening degree selector 53 selects the first merge opening degree as the merge opening degree. The control device 24A outputs, to the merge valve 15, the merge command corresponding to the first merge opening degree selected. Thus, the opening degree of the merge valve 15 is controlled on the basis of the first flow rate difference. Similarly, when the second total flow rate is greater than or equal to the maximum discharge flow rate at the second hydraulic pump 13 and the first merge opening degree is greater than the second merge opening degree, the merge opening degree selector 53 selects the second merge opening degree as the merge opening degree. The control device 24A outputs, to the merge valve 15, the merge command corresponding to the second merge opening degree selected. Thus, the opening degree of the merge valve 15 is controlled on the basis of the second flow rate difference.

In the hydraulic drive system 1A configured as described above, when the maximum discharge flow rate at the first hydraulic pump 11 is lower than the first total flow rate, it is possible to merge the working fluid from the second hydraulic pump 13 with the working fluid from the first hydraulic pump 11 via the merge valve 15. Thus, the flow rates of the working fluid at the hydraulic actuators 2, 5 can be kept from becoming insufficient. Similarly, when the maximum discharge flow rate at the second hydraulic pump 13 is lower than the second total flow rate, it is possible to merge the working fluid from the first hydraulic pump 11 with the working fluid from the second hydraulic pump 13 via the merge valve 15. Thus, the flow rates of the working fluid at the hydraulic actuators 3, 4 can be kept from becoming insufficient.

The hydraulic drive system 1A according to Embodiment 2 produces substantially the same advantageous effects as does the hydraulic drive system 1 according to Embodiment 1.

Other Embodiments

The present embodiments have thus far described the case where mainly the arm cylinder 2 and the boom cylinder 3 are simultaneously operated in the hydraulic drive systems 1, 1A; similarly, when the third to the fifth merging conditions are satisfied, the merge valve 15 opens the merge passage 15*a* by the above-described method. Furthermore, the hydraulic drive system 1 may include hydraulic actuators other than the arm cylinder 2, the boom cylinder 3, the bucket cylinder 4, and the turning motor 5, and the same can be applied to simultaneous operation of these other hydraulic actuators.

The merge valve 15 is an electromagnetic proportional control valve in the hydraulic drive systems 1, 1A according to the present embodiments, but may be an opening/closing switching valve that switches between only opening and closing of the merge passage 15*a*. The hydraulic drive system 1 may include three or more hydraulic pumps, and it is sufficient that at least one or more hydraulic pumps be included in each of the circuit systems 12, 14. The hydraulic drive system 1 may include three or more circuit systems. Furthermore, the hydraulic drive system 1 may include hydraulic actuators other than the arm cylinder 2, the boom cylinder 3, the bucket cylinder 4, and the turning motor 5.

Furthermore, in the hydraulic drive systems 1, 1A according to the present embodiments, the opening degrees of the meter-out control valves 32, 34, 36, 38 may be controlled according to the opening degrees of the corresponding meter-in control valves 31, 33, 35, 37. In other words, the meter-out flow rate may be controlled according to the meter-in flow rate. Furthermore, the opening degrees of the meter-out control valves 32, 34, 36, 38 may be controlled according to the operation commands from the operation device 23 and the loads on the hydraulic actuators 2 to 5. The method for controlling the opening degrees of the meter-out control valves 32, 34, 36, 38 is not limited to the above-described method.

The pressure compensation is performed only on the arm cylinder 2 in the hydraulic drive system 1 according to the present embodiment, but the M/I control valve opening degree calculator 45 may perform the pressure compensation on the hydraulic actuators 3 to 5. Note that the pressure of the arm cylinder 2 fluctuates more than that of the boom cylinder 3. Therefore, performing the pressure compensation on the arm cylinder 2 is particularly useful. In the hydraulic drive system 1, the pressure compensation valve for every actuator is eliminated, but it is not always necessary to eliminate the pressure compensation valve for every actuator. For example, the pressure compensation valve may be connected to the bucket cylinder 4. Furthermore, the number of operation levers of the operation device 23 may be one or three or more instead of two. For example, the operation lever may be provided, one for each of the hydraulic actuators 2 to 5.

In the hydraulic drive systems 1, 1A according to the present embodiments, the control valves 31, 33, 35, 37 which control the meter-in flow rates and the control valves 32, 34, 36, 38 which control the meter-out flow rates are provided for the hydraulic actuators 2 to 5; however, this configuration is not always limiting. For example, rod-end control valves that control the supply and drainage of the working fluid to and from the rod-end ports 2*c* to 4*c* and head-end control valves that control the supply and drainage of the working fluid to and from the head-end ports 2*d* to 4*d* are provided on the hydraulic cylinders 2 to 4. When the working fluid is supplied to the rod-end ports 2*c* to 4*c*, the rod-end control valves function as the meter-in control valves, and the head-end control valves function as the meter-out control valves. On the other hand, when the working fluid is supplied to the head-end ports 2*d* to 4*d*, the head-end control valves function as the meter-in control valves, and the rod-end control valves function as the meter-out control valves. Even the hydraulic drive system configured as just described produces substantially the same advantageous effects as does the hydraulic drive system 1.

Furthermore, in the hydraulic drive systems 1, 1A according to the present embodiments, in order to achieve autonomous-driving of the hydraulic actuators 2 to 5, the hydraulic actuators 2 to 5 may be actuated on the basis of the operation commands that are output from the operation device 23. In other words, the operation device determines the amounts of actuation of the hydraulic actuators 2 to 5 on the basis of various sensors, programs, and the like. Furthermore, the operation device sets the amounts of operation on the basis of the determined amount of actuations and outputs, to the control device 21, the operation commands corresponding to the amounts of operation. Thus, the autonomous driving of the hydraulic actuators 2 to 5 can be achieved. Note that the above-described operation device may be integrally formed with the control device 21.

From the foregoing description, many modifications and other embodiments of the present invention would be obvious to a person having ordinary skill in the art. Therefore, the foregoing description should be interpreted only as an example and is provided for the purpose of teaching the best mode for carrying out the present invention to a person having ordinary skill in the art. Substantial changes in details of the structures and/or functions of the present invention are possible within the spirit of the present invention.

The invention claimed is:

1. A hydraulic drive system comprising:

a first circuit system that controls supply and drainage of a working fluid to and from at least one or more hydraulic actuators including a first hydraulic actuator;

a first hydraulic pump that supplies the working fluid to the first circuit system;

a second circuit system that controls supply and drainage of the working fluid to and from a second hydraulic actuator;

a second hydraulic pump that supplies the working fluid to the second circuit system;

a merge valve that opens and closes a merge passage connecting the first hydraulic pump and the second hydraulic pump;

an operation device that outputs an operation command corresponding to an amount of operation specifying an amount of actuation of each of the first hydraulic actuator and the second hydraulic actuator; and a control device that controls an operation of the merge valve according to the operation command from the operation device, wherein:

the first circuit system includes:

a first meter-in control valve that controls a meter-in flow rate of the working fluid that flows to the first hydraulic actuator; and a first meter-out control valve that controls a meter-out flow rate of the working fluid that is drained from the first hydraulic actuator into a tank; and the control device controls an opening degree of the first meter-in control valve and an opening degree of the first meter-out control valve, and controls an opening degree of the merge valve on the basis of a difference between a maximum discharge flow rate of the first hydraulic pump and a first total flow rate that is a total of flow rates of the working fluid that is supplied from the first circuit system to the at least one or more hydraulic actuators.

2. The hydraulic drive system according to claim 1, wherein:

the second circuit system includes:

a second meter-in control valve that controls a meter-in flow rate of the working fluid that flows to the second hydraulic actuator; and a second meter-out control valve that controls a meter-out flow rate of the working fluid that is drained from the second hydraulic actuator into the tank; and the control device controls an opening degree of the second meter-in control valve and an opening degree of the second meter-out control valve.

3. The hydraulic drive system according to claim 1, wherein:

the control device controls the opening degree of the merge valve according to the amount of operation.

4. The hydraulic drive system according to claim 1, further comprising:

a discharge pressure sensor that measures a discharge pressure of the first hydraulic pump; and an inflow pressure sensor that measures an inflow pressure of the first hydraulic actuator, wherein:

the control device controls the opening degree of the first meter-in control valve on the basis of a target meter-in flow rate and a pressure difference, the target meter-in flow rate being based on the operation command that is output from the operation device and corresponds to the first hydraulic actuator, the pressure difference being a difference between the discharge pressure measured by the discharge pressure sensor and the inflow pressure measured by the inflow pressure sensor.

5. The hydraulic drive system according to claim 4, wherein:

the control device performs an opening degree control on the first meter-in control valve that reduces a flow rate of the working fluid that is supplied to the first hydraulic actuator under a load less than a load on the second hydraulic actuator.

6. The hydraulic drive system according to claim 1, wherein:

the second circuit system controls supply and drainage of the working fluid to and from at least one or more hydraulic actuators including the second hydraulic actuator; and the control device controls the opening degree of the merge valve on the basis of the difference between the first total flow rate and the maximum discharge flow rate of the first hydraulic pump or a difference between a maximum discharge flow rate of the second hydraulic pump and a second total flow rate that is a total of flow rates of the working fluid that is supplied from the second circuit system to the at least one or more hydraulic actuators.

* * * * *